3,183,058
PROCESS FOR LEACHING URANIUM-BEARING ORES
Philip W. Peter, Box 626, Edgemont, S. Dak.
No Drawing. Filed June 30, 1961, Ser. No. 120,947
10 Claims. (Cl. 23—14.5)

This invention relates to a process for leaching lignite and other uranium-bearing carbonaceous ores which, when wetted, become coated with oily films impervious to direct leaching and this application is a continuation-in-part of my co-pending application, Serial No. 735,945, filed May 19, 1958, now abandoned.

While potential sources of uranium, certain uranium-bearing ores, and particularly lignites and other carbonaceous ores, when wetted for leaching, become coated with an oily film which is impervious to uranium leaching agents, whether acid or carbonate. Formed on wetting, regardless of preliminary crushing and grinding and indestructible by pressure or other mechanical means, the oily coating heretofore has barred extraction of uranium from such ores except after a preliminary roasting and then on an economically impractical basis.

As a result of extensive investigation, it has been found that preliminary roasting is unnecessary and that the otherwise supposedly indestructible oily coatings can readily be destroyed by electrolytic or chemical reduction or decomposition, conducted either as a preliminary to or concurrently with the leaching step. It was theorized in the original application that the oily coating formed on wetting was molecularly bonded to the ore and that the action of the reduction was to break this bond. However, whether the bond is chemical or physical, the effect of the reduction is to disrupt or destroy the oily film and expose the ore for leaching by conventional leaching agents. Although both electrolytic and chemical reductions share the advantage that they may be carried out as part of the leaching step, electrolysis has been found to have the advantage, even over chemical reduction, not only of using either the acid or carbonate leaching agents as the electrolyte, but of markedly reducing both the amount of the leaching agent and the time required for leaching.

The primary object of the invention is to provide a process for leaching uranium-bearing ores, which, when wetted, become coated with an oily film impervious to leaching agents, whereby the oily film is destroyed by electrolytic or chemical reduction to expose the ore for leaching.

Another obejct of the present invention is to provide a process for leaching uranium-bearing ores, which, when wetted, become coated with oily films impervious to leaching agents, whereby the films may be destroyed, either prior to or concurrently with subjection of the ore to action of the leaching agent.

A further object of the invention is to provide a process for leaching uranium-bearing ores, which, when wetted, are impervious to direct leaching because of an inert oily film coating their particles, whereby the film is destroyed by electrolytic reduction with the acid or carbonate employed as the leaching agent serving as the electrolyte, thereby reducing the amount of leaching agent and time required for leaching, whether the electrolytic reduction is conducted prior to or simultaneously with leaching by the leaching agent.

Other objects and advantages will appear hereinafter in the detailed description and be particularly pointed out in the appended claims.

The process of the present invention is applicable for leaching uranium and associated minerals from any of the uranium-bearing ores or raw materials which cannot be leached diretly due to the coating of the particles of the ore, when wetted with water, with a film of hydrocarbon, carbon bisulfide or other carbonaceous or like oily liquid which is impervious or inert to leaching agents. According to the process of the present invention, such ores, including lignites and the so-called igneous or primary ores found in the front range of Colorado, may be leached indirectly by subjecting the ore to electrolytic or chemical reduction to destroy or disrupt the oily coating and such reduction may be carried out either as a preliminary step or concurrently with subjection of the ore to leaching by a leaching agent.

As in direct leaching, the process of this invention utilizes as its leaching agent either sulfuric or other mineral acid or sodium or other basic carbonate, depending on whether acid or carbonate leaching is better suited for the ore to be treated. Also, it contemplates that the ore usually will have been crushed and ground to a suitable particle or grain size and be in the form of a pulp or slurry when subjected to the reducing action by which the oily film coating its particles is destroyed. How the ore is then treated depends on whether the reduction is electrolytic or chemical and whether it is carried out prior to or concurrently with leaching by the leaching agent.

In the case of chemical reduction, the reducing and leaching agents must be compatible, if added concurrently, so as to avoid interference by either with the action of the other. However, with this limitation, the agent employed for chemical reduction may be any reducing agent which will react with the film-forming carbonaceous liquid to break the bond between the film and the surface of the ore particle contained by it. Water-soluble reducing agents, such as calcium bisulfite, are particularly suitable, since readily dispersible and addable either to the slurry or dissolved in the water with which the slurry is formed. Nonetheless, it is possible to use an insoluble agent, such as free hydrogen, by bubbling or otherwise dispersing it through the slurry to expose the oily film to its reducing action. The selected acid or carbonate leaching agent may be added either concurrently with or subsequent to the addition of the reducing agent, in the former case reacting to leach the soluble mineral content of the ore as the particles of the latter are exposed for action by destruction of their oily coatings.

In electrolytic reduction, any of the acid or carbonate reagents suitable for leaching is also a suitable electrolyte and it is preferred that the same reagent be employed for both purposes to avoid possible incompatibility. Here again, the reduction may be carried out either prior to or concurrently with actual leaching but with the advantage over chemical reduction that, because of the electrochemical action, both the amount of the leaching agent and the time required for leaching are markedly reduced in accordance with the applicable electrochemical laws. Thus, with the electric current passed between suitable electrodes, the entire indirect leaching process can be carried out, time-wise, in one to four hours, depending on the electrical energy applied, with recovery of 90% of the contained uranium by acid leaching and 95% by carbonate leaching. Electrolytic reduction has the further advantage that in certain areas it makes it possible to apply in situ leaching methods to uranium-bearing carbonaceous beds by passing an electric current through the bed, using the acid or carbonate leach as the electrolyte.

Whether the oily film is destroyed by chemical or electrolytic reduction, the uranium in the ore, in process, may be reduced from its hexa- to its tetra-valent form. This does not interfere with its leaching by the applied leaching agent but may be detrimental to subsequent treatment of the pregnant leach liquor. In such case, the uranium may be oxidized to restore it to hexa-valence by an oxidizing agent, such as manganese dioxide for acid leaching or potassium permanganate for carbonate leaching, added with or before the leaching agent, if the reducing and leaching are carried out in separate steps, or, if they are carried out concurrently, by subsequently acrifying the leached pulp.

On completion of the indirect leaching, the leached pulp may be treated to extract the uranium in oxide form in the same manner as leached pulps of directly leachable ores leached by the same leaching agent. Thus, for example, a uranium-bearing lignite may be indirectly acid leached by concurrent electrolytic or chemical reduction and acid leaching either in a ceramic-lined ball mill in which the ore is ground or, after grinding, in properly agitated leaching tanks and may have the pregnant leach liquor separated from the solids in the leached pulp by flocculation and classification and filtration by suitable means, such as the "Bird" centrifugal filter. The now solid-free uraniferous pregnant liquor may then be passed through activated charcoal which extracts from the solution any undesirable molybdenum and humic acids or other coloring matter. Poison-free, the liquor thereafter may be subjected to any of the several known methods for extracting uranium from uranium-rich liquors, such as resin in pulp, ion exchange resin column or solvent extraction or chemical separation.

If, instead of the concurrent reduction and leaching of the first example, the uranium-bearing lignite is indirectly acid leached by sequential reduction and acid leaching and the reduction is electrolytic, with sulfuric acid as the electrolyte, any uranium reduced to tetra-valence in the reduction step may be restored to hexa-valence at the outset of the leaching step by adding to the reduced pulp, along with the additional amount of sulfuric acid required for leaching, a suitable oxidizing agent, such as manganese dioxide. The pregnant leach liquor may be separated from the resulting leached pulp by the additional of a flocculating agent, such as "Separan 2610," followed by classification and filtration by suitable means, and the solids or slimes from the latter step may either be discharged as waste or treated with suitable chemicals to make fertilizers, such as super-phosphate. In accordance with known methods, the pregnant leach liquor may be reduced to an E.M.F. of −460 mv., if necessary, and thereafter have its uranium extracted by resin in pulp, ion exchange resin column or solvent extraction or chemical precipitation. Alternatively, for resin in pulp extraction, it is possible to by-pass the intervening steps and subject the leach liquor directly from the indirect leaching to such extraction, after reducing its E.M.F. to −460 mv., if necessary.

If the indirect leaching is carbonate instead of acid, as in the two preceding examples, and electrolytic reduction and leaching are carried out concurrently, the sodium or other basic carbonate, in leaching, will produce a leached pulp in the form of a lyophobic colloid. Uranium can be extracted directly from this colloid by resin in pulp extraction. Alternatively, the colloid may be broken and the solid particles caused to coagulate by the addition of a suitable agent, such as ferrous sulfate or sulfuric acid, in sufficient concentration to produce a pH of 2. After coagulation, the pulp may be treated with a suitable flocculant and classified and filtered by suitable means. Requiring no reduction in E.M.F. if ferrous sulfate was used as the coagulating agent, but otherwise reduced, if necessary, to an E.M.F. of −460 mv., the resulting clear pregnant liquor may have its uranium content extracted by resin column, resin in pulp or solvent extraction or chemical precipitation.

Understanding of the invention will be facilitated by the following specific examples of applications of the process to indirect acid leaching of uraniferous lignite using concentrated sulfuric acid as the leaching agent, the oily film formed on wetting being chemically reduced in the first example and electrolytically reduced in the second.

*Example I*

To a 1-pound sample of uraniferous lignite in a beaker of suitable size, add sufficient water to make a slurry of 30% lignite solids and 70% liquid. Add concentrated sulfuric acid (about 18 grams) to bring the pH of the mixture to 0.5. Add to the mixture as the chemical reducing agent for the oily film, sodium thiosulfate (approximately 50 grams) so that the E.M.F. of the solution is about 300. Heat and stir the mixture for two hours at about 120° F., adding acid as necessary to maintain the pH at 0.5. Remove the heat and add a small amount of a flocculating agent such as "Separan" while gently stirring. After the solids have settled to the bottom, decant the solution and save for further treatment. Wash the residue from decantation into a filter and wash several times. Add the wash liquid to the solution saved from the decantation. Discard the residue in the filter and treat the solution by regular methods for extracting uranium from clear solutions, such as resin ion exchange or solvent extraction.

*Example II*

To a 1-pound sample of uraniferous lignite in a beaker of suitable size, add sufficient water to make a slurry of 30% lignite solids and 70% liquid. Add concentrated sulfuric acid (about 18 grams) to bring the pH of the moisture up to 0.5. Suspend in the mixture at opposite sides of the beaker electrodes in the form of two pieces of iron 2" x 4" x 1/8", to each of which is affixed a wire connected to a voltage regulator. Stir the mixture and, while stirring, apply through the voltage regulator a voltage between the electrodes of 24 volts. This will produce a current between the electrodes of about 0.5 to 2 amps depending on the electrolytic strength, liquid to solid ratio, etc. Continue the stirring and applying of the current for a period of two to four hours, adding water and acid as necessary to maintain the pH at 0.5 and the slurry at roughly 30% solids. Remove the electrodes and add a small amount of "Separan" or other floccuating agent while stirring gently. After the solids have settled, decant the liquid and further treat the decanted liquid and solids as in Example I.

If in either example molybdenum is present with the uranium in the leach liquor, the molybdenum can be extracted either before or after extracting the uranium by passing the solution over activated charcoal and stripping the charcoal with sodium hydroxide.

From the above detailed description, it will be apparent that there has been provided a process for indirectly leaching uranium-bearing ores not directly leachable due to the coating of their particles when wetted with oily films impervious to leaching agents, the process being adapted to either acid or carbonate leaching and using either electrolytic or chemical reduction conducted prior to or concurrently with actual leaching to destroy the oily films and expose the particles for action by leaching agents.

Having described my invention, I claim:

1. A process for leaching a uranium-bearing carbonaceous ore which on wetting becomes coated with an oily film impervious to uranium leaching agents, comprising wetting said ore to produce said oily film thereon, destroying said oily film by subjection thereof to reduction in the presence of said wetted ore, and subjecting the ore thereby exposed to the action of a uranium leaching agent.

2. A process for leaching a uranium-bearing carbonaceous ore which on wetting becomes coated with an oily film impervious to uranium leaching agents, comprising wetting said ore to produce said oily film thereon, destroying said oily film by subjection thereof to chemical reduction in the presence of said wetted ore, and subjecting the ore thereby exposed to the action of a uranium leaching agent.

3. A process for leaching a uranium-bearing carbonaceous ore which on wetting becomes coated with an oily film impervious to uranium leaching agents, comprising wetting said ore to produce said oily film thereon, destroying said oily film by subjection thereof to electrolytic reduction in the presence of said wetted ore, and subjecting the ore thereby exposed to the action of a uranium leaching agent.

4. A process for acid leaching a uranium-bearing ore which on wetting becomes coated with an oily film impervious to acid leaching agents, comprising wetting said ore to produce said oily film thereon, destroying said oily film by subjection thereof to reduction in the presence of said wetted ore, and subjecting the ore thereby exposed to the action of an acid leaching agent.

5. A process for carbonate leaching a uranium-bearing ore which on wetting becomes coated with an oily film impervious to carbonate leaching agents, comprising wetting said ore to produce said oily film thereon, destroying said oily film by subjection thereof to reduction in the presence of said wetted ore, and subjecting the ore thereby exposed to the action of a carbonate leaching agent.

6. A process for leaching a uranium-bearing carbonaceous ore which on wetting becomes coated with an oily film impervious to uranium leaching agents, comprising wetting said ore to produce said oily film thereon, destroying said oily film by subjection thereof to electrolytic reduction in the presence of said wetted ore using a uranium leaching agent as the electrolyte, and subjecting the ore thereby exposed to leaching by said leaching agent.

7. A process for acid leaching a uranium-bearing carbonaceous ore which on wetting becomes coated with an oily film impervious to acid leaching agents, comprising wetting said ore to produce said oily film thereon, destroying said oily film by subjection thereof to electrolytic reduction in the presence of said wetted ore using an acid leaching agent as the electrolyte, and subjecting the ore thereby exposed to acid leaching by said acid leaching agent.

8. A process for carbonate leaching a uranium-bearing carbonaceous ore which on wetting becomes coated with an oily film impervious to carbonate leaching agents, comprising wetting said ore to produce said oily film thereon, destroying said oily film by subjection thereof to electrolytic reduction in the presence of said wetted ore using a carbonate leaching agent as the electrolyte, and subjecting the ore thereby exposed to carbonate leaching by said carbonate leaching agent.

9. A process for leaching a uranium-bearing carbonaceous ore which on wetting becomes coated with an oily film impervious to uranium leaching agents, comprising wetting said ore to produce said oily film thereon, destroying said oily film by subjection thereof to electrolytic reduction in the presence of said wetted ore using a uranium leaching agent as the electrolyte, and concurrently subjecting the ore thereby exposed to leaching by said leaching agent.

10. A process for leaching a uranium-bearing carbonaceous ore which on wetting becomes coated with an oily film impervious to uranium leaching agents, comprising wetting said ore to produce said oily film thereon, destroying said oily film by subjection thereof to electrolytic reduction in the presence of said wetted ore using a leaching agent as the electrolyte, and subsequently subjecting the ore thereby exposed to leaching by said leaching agent.

References Cited by the Examiner
UNITED STATES PATENTS

| 1,526,943 | 2/25 | Thews | 23—14.5 |
| 1,577,411 | 3/26 | Thews | 23—14.5 |
| 2,741,589 | 4/56 | Kunin | 204—1.5 |

OTHER REFERENCES

AEC Document, ORNL 1569, August 7, 1953, pp. 12, 25–27.

CARL D. QUARFORTH, *Primary Examiner.*

REUBEN EPSTEIN, *Examiner.*